United States Patent [19]

Niemeyer, III

[11] Patent Number: 4,937,594

[45] Date of Patent: Jun. 26, 1990

[54] LARGE VOLUME PEN

[75] Inventor: Robert H. Niemeyer, III, Beaverton, Oreg.

[73] Assignee: AM International Corporation, Chicago, Ill.

[21] Appl. No.: 267,797

[22] Filed: Nov. 7, 1988

[51] Int. Cl.$^5$ .............................................. E01D 15/16
[52] U.S. Cl. .............................. 346/140 R; 346/140 A
[58] Field of Search ....................... 346/140 R, 140 A

[56] References Cited

U.S. PATENT DOCUMENTS 4,017,870  4/1977  Hubbard et al. ............... 346/140 A Primary Examiner—Bruce A. Reynolds
Assistant Examiner—Huan Tran
Attorney, Agent, or Firm—Roy A. Ekstrand; Nicholas A. Camasto

[57] ABSTRACT

A large volume recording pen suitable for use in graphic recorders and the like includes an elongated cylindrical body defining an internal ink reservoir. A cap is secured to the upper portion of the cylindrical body while the lower portion defines a tapered portion joined to a downwardly extending reduced section tip extension. A conventional ball receptacle is formed at the lower end of the tip extension and supports a captivated recording ball. A pressure ball sized and configured to be received within and freely movable within the interior of the pen body supports a coating of non-wetting material. An ink supply is supported within the cylindrical body and is in communication with the ball receptacle and recording ball by a tip supply passage within the tip extension. The pressure ball is supported upon the upper surface of the ink supply within the cylindrical pen body by the capillary action of the ink. The pressure ball, in its preferred form, is substantially more dense than the ink and therefore provides a substantial downward pressure upon the ink forcing it to the ball receptacle.

15 Claims, 2 Drawing Sheets

LARGE VOLUME PEN

FIELD OF THE INVENTION

This invention relates generally to graphic recording systems and particularly to recording pens used therein.

BACKGROUND OF THE INVENTION

With the development of computers having ever increasing computing power, a number of peripheral devices suited for operation in conjunction with the computer have been developed. One of the more useful peripheral devices is known as a graphic recorder or plotter which functions under computer control to provide a graphic output similar to drawings and the like. While the structure of such plotters varies generally with the desired functions and the preferences of plotter manufacturers and users, they all generally comprise a movable pen carriage together with drive means for moving the pen carriage back and forth along a pen carriage path. A media support platen or similar device is positioned beneath the pen carriage path and includes media drive means which engage the media and move it back and forth. In virtually all plotter systems the directions of pen carriage motion and media motion are perpendicular to each other. The desired recording or plot is obtained by computer controlled coordinated movement of the media and pen carriage to record the desired pattern upon the media.

In most instances, the recording element supported upon the pen carriage comprises a recording pen which produces an inked plot upon the media. In their simplest form, recorders have been constructed which support a single pen upon the pen carriage. In more sophisticated plotters, however, a plurality of pens are supported upon the pen carriage. In the latter case, means are provided for selectively engaging and lowering the desired one of the multiple pens into recording contact with the media.

While the use of the presently available recording pens in graphic recorders or plotters provides a substantial benefit to the user, several problems or limitations of recorder performance and capability arise due to the present limitations of the recording pens. Numerous pen designs have been created to meet the needs of graphic recorders. Generally, such recording pens comprise a pen body which includes an ink reservoir, a pen tip and a recording element supported at the end of the pen tip. Means are provided within the pen body and pen tip for communicating the ink from the reservoir to the recording element. Different recording element structures have been utilized to provide different recording characteristics. Two of the more common types are the porous fiber tip recording element and the ball-point pen recording element.

Regardless of the type of pen construction used, several problems or limitations of pen structure have persisted. Most significantly, problems associated with small ink supplies and the wear imposed upon the recording element have limited recording pen life. In addition, the viscosity of the recording ink must be carefully controlled to provide proper ink flow during the ever increasing plotting speeds attained by modern plotters.

It has been found generally that attempts to provide extended pen life together with recording capabilities at higher plotting speeds are not successful with conventional recording pen sturctures such as those described above. Some improvement is realized, however, in the more recently developed pressurized ball-point recording pens. Such pressurized ball-point pens generally comprise an elongated pen body having a sealed ink reservoir which is pressurized with a captive quantity of compressed air or other gas within the ink reservoir which forces the flow of ink to the recording element together with a ball-point recording element in communication with the ink reservoir. While the use of pressurized ball-point pen structures has provided improved recording pen life due to the reduced recording element wear of the ball-point recording element, a number of problems or limitations persist. It has been found, for example, that the ink used in such pressurized pens must have a relatively high viscosity and must include ingredients which provide for the ready formation of a "crust" or layer of dried ink around the recording element ball during nonuse. This crust or dried ink layer is required to prevent the ink from being pushed out through the recording ball element structure by the gas pressure within the ink reservoir. The use of high viscosity inks, in turn, requires substantial gas pressures within the pen and an increase in the writing force exerted by the recorder between the recording pen and the media to cause ink to flow around the ball element during the recording process. In addition, the pressurized ink chamber or reservoir has not heretofore been effectively manufactured using molded plasitc or other materials but has instead been formed of a metal material. The use of metal pen bodies is costly and increases the pen weight. In addition, complications arise due to the corrosive character of many inks which cause them to attack metal pen bodies. Increased pen weight becomes a significant problem in graphic recorders using multiple pens supported upon the pen carriage in that the inertia created by increased pen mass imposes a limitation on plotter speed and performance.

Finally, the shape of the pressurized ink reservoir must provide a relatively small cross-sectional area to ensure that the meniscus formed at the top of the ink supply prevents the pressurizing gas from flowing to the recording end of the pen in the event the pen is placed on its side. In such case, the transfer of the pressurizing gas to the recording end of the pen body raises the possibility of a gas pressure leak which would render the pen useless as well as the possible creation of trapped pressurized gas bubbles within the ink supply when the pen is righted for use in the recorder. If such gas bubbles reach the writing ball, the gas would escape rendering the pen useless.

In view of the foregoing problems, there remains a need in the graphic recording art for a recording pen which provides a long wearing recording element in combination with a large ink reservoir and which permits the use of lower viscosity inks to provide reliable high-speed recording without excessive recording pressure and which may be inexpensively fabricated from a lightweight molded plastic material and which is resistent to damage when placed on its side.

SUMMARY OF THE INVENTION

Accordingly, it is a general object of the present invention to provide an improved pen for use in a graphic recorder. It is a more particular object of the present invention to provide an improved recording pen for use in a graphic recorder having longer pen life, higher reliability and lower cost lightweight construction.

In accordance with the present invention, there is provided a recording pen having an elongated body defining therein an ink reservoir, a recording element in communication with the ink reservoir, a supply of recording ink supported within the ink reservoir forming an upper meniscus boundary, and a pressure weight supported upon the ink at said meniscus boundary and producing a recording pressure thereon.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjuction with the accompanying drawings, in the several figures of which like reference numerals identify like elements and in which:

DESCRIPTION OF THE PREFERRED EMBODIMENT

Figure 1:
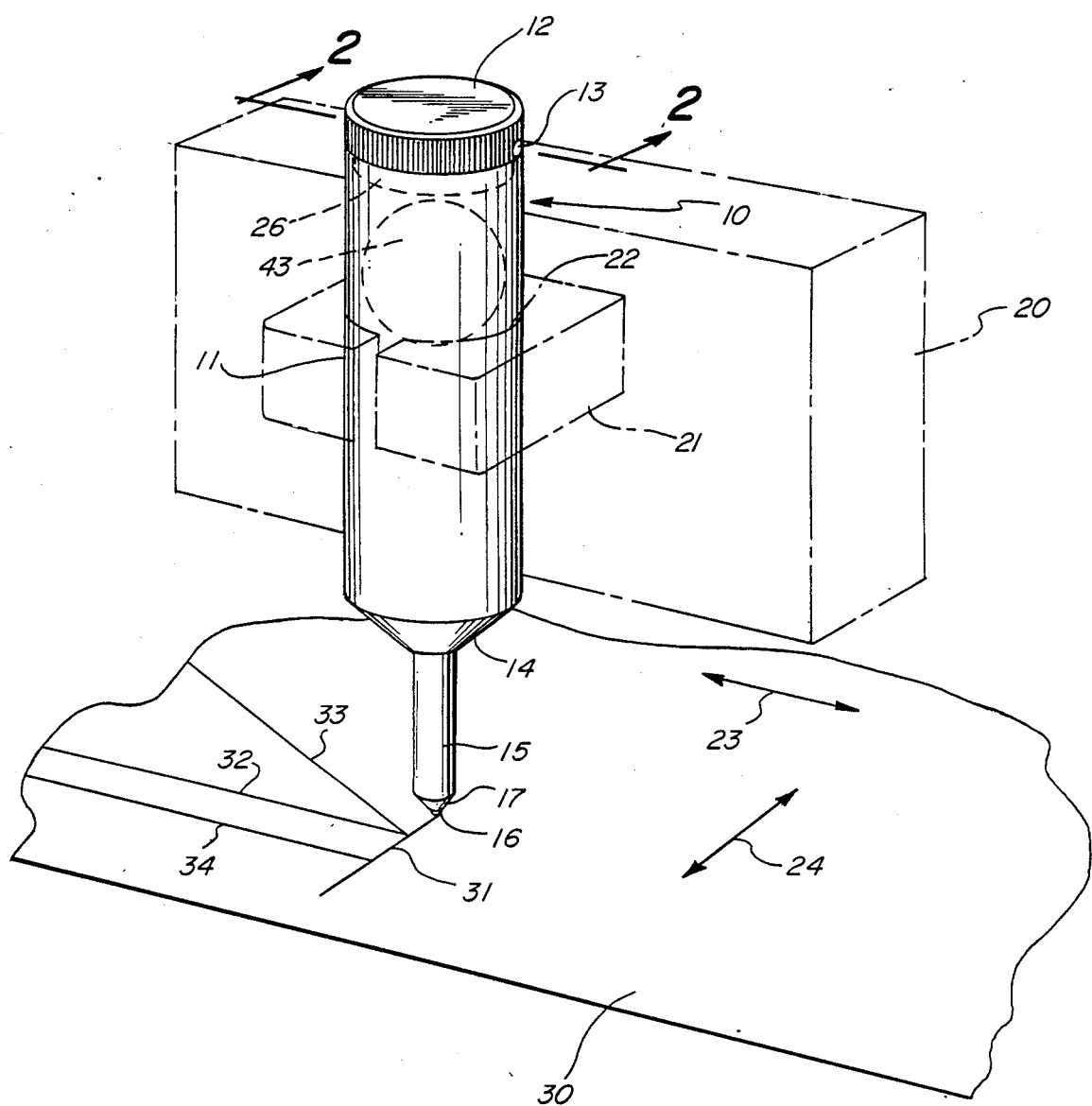
FIG. 1 is a perspective view of a large volume recording pen constructed in accordance with the present invention in the vertical position.

FIG. 1 sets forth a perspective view of the present invention large volume pen generally referenced by numeral 10 supported in a pen carriage 20 by a pen receptacle 21. Pen receptacle 21 and pen carriage 20 are depicted in dashed-line form and should be understood to be generally representative of the various pen carriage constructions both single pen and multiple pen types. Pen receptacle 21 further defines a generally circular cross section pen slot 22 which receives pen 10.

Pen 10 defines a generally cylindrical body 11. Cylindrical body 11 further defines an interior ink reservoir 51 (better seen in FIG. 2). As is also better seen in FIG. 2, an ink supply 41 is supported within ink reservoir 51 and defines an ink level 42. In accordance with an important aspect of the present invention described below in greater detail, a pressure ball is supported upon the ink level within the ink reservoir. A cap 12 is secured to the upper portion of cylindrical body 11 by an adhesive or other suitable material and defines a vent aperture 13 which extends through cap 12 and into the interior of cylindrical body 11 above the ink level. The function of vent aperture 13 is to provide a volume of air at atmospheric pressure within cylindrical body 11 above the ink level and pressure ball.

Pen 10 further defines a downwardly extending tapered portion 14 and a smaller diameter tip extension 15 extending therefrom. Tip extension 15 terminates in a ball receptacle 17 which in accordance with conventional ball-point pen fabrication techniques supports a writing ball 16.

A media 30 is supposed by conventional graphic recorder structure beneath pen carriage 20 and pen 10. In accordance with conventional fabrication techniques, pen carriage 20 includes means for lowering pen 10 to media 30 such that recording ball 16 is brought into contact with media 30 and an appropriate recording pressure is exerted upon media 30 by pen 10. In further accordance with conventional graphic recorder operations, means are provided for moving media 30 back and forth in the directions indicated by arrows 24 while coordinated means are operated upon carriage 20 to move carriage 20 and pen 10 back and forth along the carriage path indicated by arrows 23. Thus, in the conventional graphic recording operation, a plurality of lines 31 through 34 are recorded upon media 30 by the combined motions of pen carriage 20 and media 30. For example, line 31 is recorded upon media 30 by maintaining the position of pen carriage 20 and moving media 30. Conversely, lines such as lines 32 and 34 result from maintaining media 30 at a constant position and moving pen carriage 20 in the directions indicated by arrow 23. In addition, other lines such line 33 are produced by coordinated motions of media 30 and pen carriage 20.

As the above-described recording process is carried forward, the ink within pen body 11 is, by means set forth below in greater detail, continually supplied to ball receptacle 17 and is carried by the rolling action of ball 16 to be deposited upon media 30. In further accordance with the present invention and by means better seen in FIG. 2 and further described below, pressure ball 43 provides an appropriate pressure upon ink supply 41 to assure the proper flow of ink supply 41 to ball receptacle 17. In addition, pen body 11 may be molded using a transparent plastic material such that the amount of ink remaining within pen body 11 may be determined by examination of ink level visible through the transparent pen body. In accordance with the operation described below in greater detail, pressure ball 43 (seen in FIG. 2) continues to be supported upon ink level 42 and thus moves downwardly within ink reservoir 51 as ink supply 41 is depleted and ink level 42 descends. In addition, as ink supply 41 is depleted, additional air is drawn into cylindrical body 11 above ink level 42 through vent aperture 13 to permit the continuous presence of atmospheric pressure upon pressure ball 43 and ink level 42.

Figure 2:
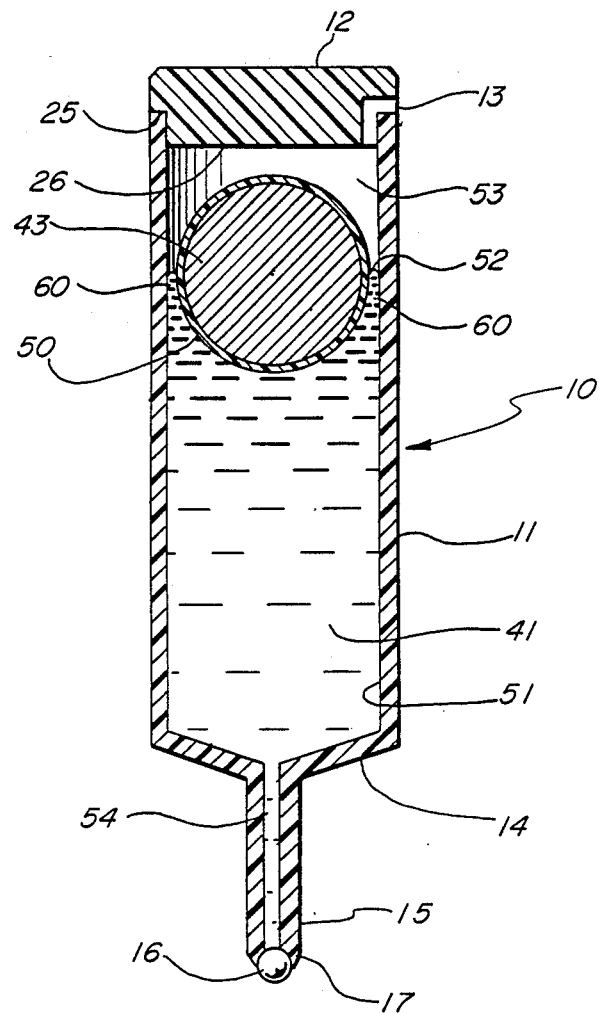
FIG. 2 is a section view of the present invention large volume recording pen in the vertical position taken along section lines 2—2 in FIG. 1.

FIG. 2 sets forth a section view of the present invention large volume pen shown in FIG. 1 taken along section lines 2—2 therein. Accordingly, pen 10 defines a generally cylindrical body 11 having an internal ink reservoir 51 supported an ink supply 41. Pen 10 further defines a downwardly extending tip extension 15 which is joined to cylindrical body 11 by a tapered portion 14 and which terminates in a ball receptacle 17. Tip extension 15 defines an internal tip supply passage 54 which extends upwardly from ball receptacle 17 to ink reservoir 51. A writing ball 16 is captivated within ball receptacle 17 and in accordance with conventional ballpoint pen construction is free to rotate within ball receptacle 17. In the perferred constructions, cylindrical pen body 11, tapered portion 14 and tip extension 15 are formed of a single molded plastic unit using a material which produces a nonwetting surface within the ink reservoir 51.

A pen cap 12, also preferably formed of a molded plastic member, defines a cylindrical plug 26 and a sealing lip 25. Plug 26 is configured to fit snugly within the interior portion of cylindrical pen body 11 while lip 25 is configured to receive the end portion of cylindrical body 11. Cap 12 may be press-fitted to cylindrical body 11 or secured thereto by a suitable adhesive in accordance with designer preference. As mentioned above, cap 12 defines a vent aperture 13 extending through cap 12 to the interior of cylindrical pen body 11.

A pressure ball 43 comprises a spherical member having a cross-sectional area smaller than ink reservoir 51. In accordance with an important aspect of the present invention, pressure ball 43 supports a coating 50 formed of a nonwetting material. In further accordance with the invention, the size of pressure ball 43 and its coating 50 remain smaller than the cross-sectional area of ink reservoir 50. Thus, with pressure ball 43 received within ink reservoir 51, a gap 60 extends about pressure ball 43 and coating 50 to space pressure ball 43 and coating 50 from the interior wall surfaces of cylindrical body 11. Because of the nonwetting properties of coating 50 and the surface of ink reservoir 51, pressure ball 43 is supported by the capillary action of ink supply 41 rather than sinking. The presence of gap 60 encircling pressure ball 43 causes a correspondingly shaped meniscus 52 to be formed within gap 60 and extending between coating 50 and the interior wall surfaces of cylindrical pen body 11. Thus, pressure ball 43 is supported upon ink supply 41 and exerts a downward force upon ink supply 40. In accordance with an important aspect of the present invention, the material selected to fabricate pressure ball 43 is selected to provide the desired weight for pressure ball 43 in view of the viscosity of the ink within ink supply 41. The vent passage provided by vent aperture 13 through cap 12 provides a volume of air 53 within cylindrical body 11 above meniscus 52 and pressure ball 43 at atmospheric pressure.

As a result of the foregoing described structure, the portion of ink supply 41 in communication with writing ball 16 and ball receptacle 17 is subjected to a pressure which is the combined pressure due to the hydrostatic force of the ink within ink supply 41 above ball receptacle 17 together with the pressure provided by the weight of pressure ball 43. Because the proportionate part of the ink pressure provided by the hydrostatic head of the ink itself as ink supply 41 is depleted, it has been found desirable to select the material of pressure ball 43 to provide a substantially greater pressure component from the pressure ball than from the hydrostatic ink force. Thus in its preferred form, pressure ball 43 is fabricated from a heavy metal such as steel.

In operation with pen 10 in the upright position shown in FIGS. 1 and 2, the ink within ink supply 41 is subjected to a writing pressure described above and is forced against writing ball 16 and ball receptacle 17. As ball 16 is rolled against the media, ink within tip passage 54 is carried through ball receptacle 17 by the rotation of writing ball 16 in accordance with conventional ballpoint pen operation and is deposited upon the media. As the ink within ink supply 41 is used in the recording process, the level of meniscus 52 moves downwardly within cylindrical pen body 11. Because pressure ball 43 is suspended at the upper boundary of ink supply 41 and maintained due to the capillary action of the ink within ink supply 41 within gap 60, pressure ball 43 moves directly with meniscus 52 in the downward direction as ink supply 41 is depleted. As pressure ball 43 and meniscus 52 move downwardly within cylindrical body 11, the air volume 53 above pressure ball 43 and meniscus 52 increases and is maintained at atmospheric pressure by air drawn through vent aperture 13. Thus, in accordance with an important aspect of the present invention, pressure ball 43 provides a substantially constant pressure upon ink supply 41 notwithstanding the depletion of the ink supply during the recording process. This operation is in sharp contrast to the operation of the above-described prior art devices which utilize a captive pressurized gas to exert a force against the ink supply. In such prior art pens, the force provided the pressurized gas changes dramatically as the volume of confined gas changes due to depletion of the ink supply.

Figure 3:
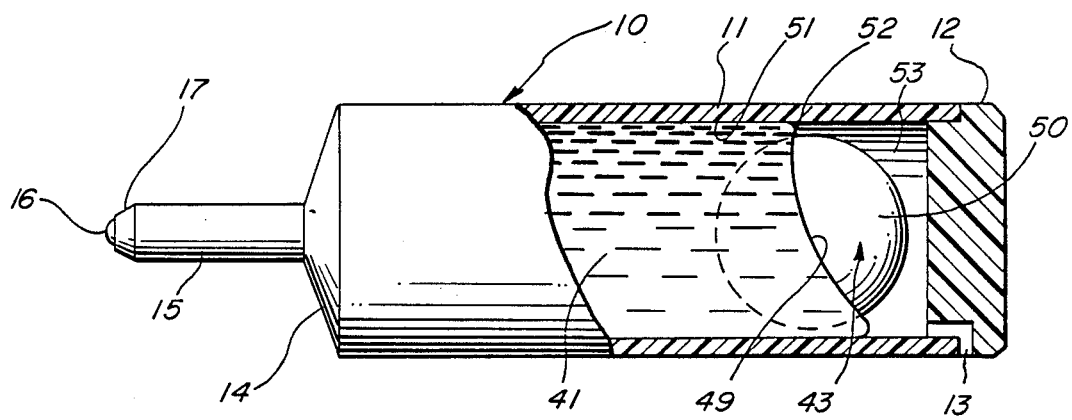
FIG. 3 is a partially sectioned view of the present invention large volume recording pen in a horizontal position.

FIG. 3 sets forth a partially sectioned view of the present invention large volume pen in a horizontal position. Pen 10 comprises a generally cylindrical pen body 11 supporting a cap 12 which defines a vent 13 and defining an internal ink reservoir 51. An ink supply 41 is supported within ink reservoir 51 and a pressure ball 43 is supported upon ink surface 49 of ink supply 41. Pen 10 further defines an elongated tip extension 15 which terminates in a ball receptacle 17 supporting a writing ball 16 and which is joined to cylindrical body 11 by a taper portion 14. Pressure ball 43 supports a nonwetting coating 50 as described above. In accordance with an important aspect of the present invention, the capillary action of ink supply 41 against coating 50 and pressure ball 43 causes the formation of meniscus 52 between pressure ball 43 and the interior surface of cylindrical body 11. In accordance with the above-described operation, the capillary action of ink supply 41 supports pressure ball 43 notwithstanding the heavier weight of the pressure ball. Comparison of FIGS. 2 and 3 shows the effect of the change from the vertical position of FIG. 2 to the horizontal position of FIG. 3 upon ink supply 41 and pressure ball 43. In accordance with an important aspect of the present invention, the horizontal position of pen 10 alters somewhat but does not disturb the capillary action between coating 50 of pressure ball 43 and ink supply 41. As a result, the integrity of meniscus 52 is maintained and ink supply 42 continues to be captivated against pressure ball 43 and meniscus 52 within cylindrocal body 11. As a result, ink is prohibited from flowing out through vent aperture 13 when pen 10 is horizontally positioned. In addition, the integrity of meniscus 52 being maintained prohibits the transfer of air from air volume 53 past ink surface 49. As a result, the present invention large volume pen may be horizontally positioned as shown in FIG. 3 without the creation of air bubbles within ink supply 41 and without other destructive effects which such horizontal positioning causes in the above-described prior art pens. In essence, the combination of pressure ball 43 and meniscus 52 from a barrier between air volume 53 and ink supply 41. Thus, with the integrity of the ink supply and air volume maintained, pen 10 continues to write properly when raised to the vertical position shown in FIG. 2. In addition, it should be noted that with pen 10 in the horizontal position shown in FIG. 3, very little force is applied to ink supply 41 against ball receptacle 17, thus the tendency to leak exhibited by prior art pens during storage is substantially avoided by the present invention large volume pen construction.

What has been shown is a large volume recording pen which may be readily fabricated from inexpensive molded components and which provides a large ink reservoir and permits the use of higher viscosity inks to provide reliable high-speed recording over extended periods of time. The inventive large volume recording pen shown may be readily placed in a horizontal position for extended periods of time without substantial leakage or the production of air or gas pockets within the ink supply.

That which is claimed is:
1. A recording pen comprising:
an elongated pen body defining first and second ends and an ink reservoir for receiving an ink supply such that said ink supply defines an upper surface, said ink reservoir defining a generally uniform cross section;

a tip extension joined to said first end of said pen body defining an interior passage in communication with said ink reservoir and a recording element receptacle;

a recording element supported within said recording element receptacle; and a pressure member, having an external surface coated with a nonwetting material, supported upon said upper surface of said ink supply, said pressure member generally conforming to and being smaller than said cross section.

2. A recording pen as set forth in claim 1 wherein said ink reservoir defines an interior wall surface and wherein said upper surface of said ink supply defines a meniscus between said wall surface and said pressure member.

3. A recording pen as set forth in claim 2 wherein said elongated pen body and said ink reservoir are generally cylindrical and wherein said pressure member is generally spherical.

4. A recording pen as set forth in claim 3 wherein said pressure member has a greater density than the ink within said ink supply and wherein said pressure member is supported upon said ink supply by capillary action of said ink supply within said ink reservoir.

5. A recording pen as set forth in claim 4 wherein said recording element defines a writing ball rotatably supported within said recording element receptacle.

6. A recording pen as set forth in claim 5 including a cap secured to said second end of said pen body, said cap defining a vent aperture extending therethrough.

7. A recording pen as set forth in claim 6 wherein said pen body and said tip extension are formed of an integral molded plastic member.

8. A recording pen comprising:

a generally cylindrical pen body having a large diameter portion defining a generally cylindrical interior cavity and a smaller diameter portion joined to said larger diameter portion and defining a ball receptacle and an internal passage coupling said ball receptacle to said interior cavity;

a writing ball captivated within said ball receptacle;

a supply of ink supported within said interior cavity and said internal passage, said ink defining an upper surface within said interior cavity; and a generally spherical pressure ball having a nonwetting outer surface and a diameter less than said interior cavity supported upon said upper surface of said ink supply.

9. A recording pen as set forth in claim 8 wherein said interior cavity defines a nonwetting interior wall surface and wherein said pressure ball is sized with respect to said interior cavity such that a small gap exists between said interior wall surface and said outer surface of said pressure ball.

10. A recording pen as set forth in claim 9 wherein said pressure ball is formed of metal having a greater density than said ink and includes an outer coating of nonwetting material.

11. A recording pen as set forth in claim 10 wherein said ink forms a meniscus within said gap and wherein said pressure ball is supported by the capillary action of said ink between said pressure ball and said interior wall surface.

12. A recording pen as set forth in claim 11 wherein said pen body includes a cap supported above pressure ball and defining a vent aperture.

13. A recording pen as set forth in claim 12 wherein said pen body is formed of a molded plastic member.

14. A recording pen comprising a recording element, an ink reservoir having a nonwetting interior surface, a supply of ink within said ink reservoir, coupling means coupling said supply of ink to said recording element and pressure means providing a force upon said ink urging it from said ink reservoir toward said recording element, said pressure means including a pressure weight having a nonwetting outer surface supported upon said ink supply.

15. A recording as set forth in claim 14 wherein said ink reservoir and said coupling means are formed of a single molded plastic member.

* * * * *